17/98 OR 5,775,961

US005775961A

United States Patent [19]

Myer et al.

[11] Patent Number: 5,775,961

[45] Date of Patent: Jul. 7, 1998

[54] ELECTRICAL CONTACT ASSEMBLY

[75] Inventors: John Mark Myer, Millersville; Keith Robert Denlinger, Lancaster, both of Pa.

[73] Assignee: The Whitaker Corporation, Wilmington, Del.

[21] Appl. No.: 744,886

[22] Filed: Nov. 8, 1996

Related U.S. Application Data

[63] Continuation of Ser. No. 421,729, Apr. 13, 1995, abandoned.

[51] Int. Cl.[6] .......................... H01R 13/187; H01R 15/10

[52] U.S. Cl. .......................... 439/843; 439/851

[58] Field of Search .......................... 439/843, 851

[56] References Cited

U.S. PATENT DOCUMENTS

| | | | |
|---|---|---|---|
| 4,031,614 | 6/1977 | Gipe. | |
| 4,168,878 | 9/1979 | Risser et al. | |
| 4,262,987 | 4/1981 | Galusser et al. | |
| 4,278,317 | 7/1981 | Gallusser et al. | |
| 4,304,457 | 12/1981 | Lissau. | |
| 4,317,609 | 3/1982 | Lapraik. | |
| 4,431,256 | 2/1984 | Piscitelli et al. | |
| 4,447,108 | 5/1984 | Ghigliotti et al. | |
| 4,493,527 | 1/1985 | Piscitelli et al. | |
| 4,540,234 | 9/1985 | Könnemann et al. | |
| 4,550,972 | 11/1985 | Romak. | |
| 4,566,752 | 1/1986 | Hemmer. | |
| 4,734,064 | 3/1988 | Knapp et al. | |
| 4,767,350 | 8/1988 | Cooper et al. | |
| 4,772,234 | 9/1988 | Cooper. | |
| 4,776,651 | 10/1988 | Paulo. | |
| 4,886,474 | 12/1989 | Drogo. | |
| 4,906,212 | 3/1990 | Mixon, Jr. | |
| 4,938,720 | 7/1990 | Romak. | |
| 5,067,916 | 11/1991 | Denlinger et al. | |
| 5,106,329 | 4/1992 | Maeshima et al. | |
| 5,186,663 | 2/1993 | Wymelenberg. | |
| 5,188,545 | 2/1993 | Hass et al. | |
| 5,322,459 | 6/1994 | Spinnato. | |
| 5,334,058 | 8/1994 | Hotea. | |
| 5,362,262 | 11/1994 | Hotea. | |
| 5,376,012 | 12/1994 | Clark. | |
| 5,419,723 | 5/1995 | Villiers et al. | 439/843 |
| 5,558,547 | 9/1996 | Breitschaft et al. | 439/843 |

*Primary Examiner*—Neil Abrams
*Assistant Examiner*—Katrina Davis

[57] ABSTRACT

An electrical receptacle contact assembly (10) having a contact (20) and a drawn sleeve (40). Contact (20) includes beams (26) having indent portions (26a) for providing four points of contact between the beams and pin to be inserted into the receptacle contact assembly (10). Elongated apertures (28) are formed between two pair of the beams adjacent to respective webs (27) of the beam pairs. Drawn sleeve (40) includes a sharp annular edge (43) at a rear end thereof for engaging a latching finger of an electrical housing, and the sleeve (40) includes a dimple (49) for interlocking the sleeve (40) with the contact 20.

25 Claims, 1 Drawing Sheet

ELECTRICAL CONTACT ASSEMBLY

This application is a Continuation of application Ser. No. 08/421,729 filed Apr. 13, 1995, now abandoned.

The present invention relates to an electrical receptacle contact. More particularly, the present invention relates to an electrical receptacle contact having two pairs of contact beams with each pair connected at an end by a web portion.

BACKGROUND OF THE INVENTION

Prior electrical connectors include receptacle contacts for mating with pin contacts. These known receptacle contacts have in some cases included a sleeve member surrounding the contact beams. An example of such a known receptacle contact is disclosed in U.S. Pat. No. 5,067,916, which is hereby incorporated by reference in its entirety. This known contact provides a receptacle contact with a single pair of contact beams arranged for receipt of a pin to be inserted into the receptacle contact. The sleeve generally acts to guide the pin, protect the contact beams, and to retain the receptacle contact in a respective electrical connector housing by providing a shoulder to which a latching arm of the electrical housing may latch. Such known electrical receptacle contacts advantageously provide a means to electrically interconnect a receptacle contact with a pin contact; however, the sleeves have been known to work themselves loose and thereby loosen the receptacle contact from the electrical connector housing thereby permitting inadvertent withdrawal of the receptacle contact when separating forces are applied to the conductor terminated to the receptacle contact. Moreover, if the contact includes a plurality of independently movable contact beams the pin may tend to stub or otherwise be deformed or damaged when it is inserted into the receptacle contact. Finally, the known receptacle contact may tend to have a high insertion force requirement for the pin due to the stiffness of the contact beams.

The electrical receptacle contact of the present invention seeks to overcome the deficiencies of prior receptacle contacts by providing a sleeve which is firmly fixed to the receptacle contact, and by providing contact beams which are adapted to generate a low insertion force and yet will provide at least four points of contact between the receptacle contact and the pin contact. Moreover, the present invention seeks to eliminate stubbing and other damage to the receptacle contact, and is of a low production cost and is easy to manufacture.

SUMMARY OF THE INVENTION

The present invention provides an electrical receptacle contact assembly for electrically receiving a pin contact comprising a wire termination section, the receptacle contact further comprises: first and second beam pairs with each beam including at least one section which comprises an inner edge, the inner edges are adapted to provide four points of contact with the pin; and a sleeve member which encloses the beams.

DETAILED DESCRIPTION OF THE INVENTION

Figures 1, 2, 3, 4, 5:
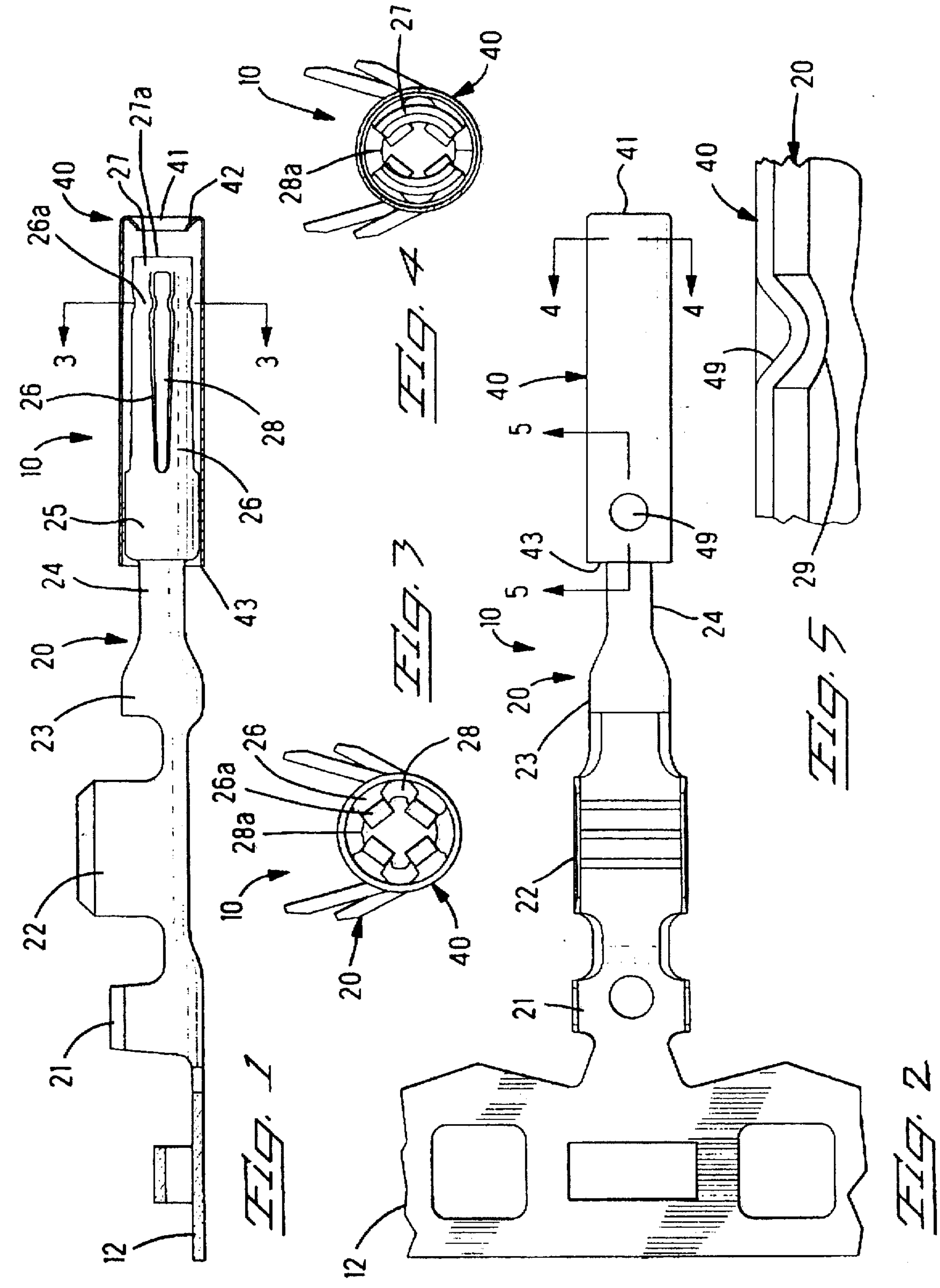
FIG. 1 shows the receptacle contact of the present invention in a side elevational view with a cross section of the sleeve.
FIG. 2 shows a top view of the receptacle contact of FIG. 1.
FIG. 3 is a cross sectional view of the contact of FIG. 1 taken at line 3—3.
FIG. 4 is a cross sectional view of the electrical contact as shown in FIG. 1 taken along line 4—4 of FIG. 2.
FIG. 5 is a cross sectional view of a portion of the electrical receptacle contact of the present invention taken at line 5—5 of FIG. 2.

FIG. 1 shows an electrical receptacle contact assembly 10, according to the present invention, connected to a carrier strip 12. The receptacle contact assembly 10 includes a contact 20, and a drawn sleeve 40 surrounding a portion of the contact 20. The contact 20 includes an insulation crimp portion 21, a wire gripping portion 22, a bottleneck portion 23, a neck 24, an annular shoulder 25, four beams 26 each having a respective indent 26a, a pair of webs 27 extending from free ends 27a connecting pairs of beams 26, and an elongated aperture 28 separating the pairs of beams Drawn sleeve 40 includes a pin receiving aperture 41, a flange 42 adjacent to aperture 41, and an end edge 43. In the preferred embodiment, there are four beams 26 with two pairs of the beams connected by webs 27, but all four beams 26 comprise an indent portion 26a formed adjacent to a respective web 27. Elongated apertures 28 are disposed between the pairs of beams 26 but an elongated slot or gap 28a is formed at the top and bottom of the beam pairs so that when the pin contact is inserted the beam pairs will separate accordingly to accommodate the pin.

As best shown in FIG. 3, the contact beams 26 are arranged symmetrically about a longitudinal axis of the contact 20 for providing four point contact with a pin (not shown in the drawing) inserted into the receptacle contact assembly 10. As is best shown in FIG. 4, a pin will first engage the beams 26 in the area of webs 27 thereby making initial electrical contact with the pin. Referring to FIGS. 2 and 5, drawn sleeve 40 also includes a dimple 49 which is pushed down into a hole 29 of contact 20 thereby interlocking sleeve 40 with contact 20. Thus assembled, a latching arm of an electrical connector housing (not shown in the drawing) can engage edge 43 of sleeve 40 thereby effectively retaining the contact receptacle 10 within the electrical connector housing. Additionally, web 27 prevents stubbing of the pin contact when it is inserted into the receptacle 10. Further, the compliancy of beams 26, in combination with indents 26a, will impart good electrical contact between the contact 20 and a pin, but will also generate a low contact insertion force as well.

Additionally, forming beams 26 with indents 26a assures that there will be four points of contact between contact 20 and a pin, and having webs 27 connect two pairs of the beams assures that if the pin is not inserted properly, the beams 26 will advantageously twist slightly to accommodate the pin and still result in four points of contact with the pin. Moreover, forming the elongated slots 28a adjacent to webs 27 and beams 26 provides a desirable stress distribution within the contact beams 26 thereby resulting in better spring force and compliancy characteristics.

Thus, while a preferred embodiment of the invention has been disclosed, it is to be understood that the invention is not to be strictly limited to such embodiment but may be otherwise variously embodied and practiced within the scope of the appended claims.

Accordingly, what is claimed is:

1. An electrical receptacle contact assembly for electrically receiving a pin contact comprising a wire termination section, said receptacle contact further comprising:

a first contact member having a free end and comprising a first pair of beams each having at least one section which comprises an inner surface which is adapted for electrical engagement with said pin contact;

a second contact member having a free end and comprising a second pair of beams;

said first and second contact members define a pin contact receiving area therebetween, said contact members are separated by two distinct gaps, said gaps are disposed between said free ends and are located at opposed positions relative to an axial length of said contact, and said gaps expand as said pin contact is inserted into said receptacle contact; and a sleeve member which encloses said contact members.

2. The electrical receptacle contact of claim 1, wherein said pair of beams comprises an elongated aperture between the beams for imparting compliancy to the beam pair.

3. The electrical receptacle contact of claim 2, wherein said first pair of beams comprises a web member which joins the beams adjacent to said elongated aperture.

4. The electrical receptacle contact of claim 2, wherein said first pair of beams comprises at least one respective indent formed on each respective beam.

5. The electrical receptacle contact of claim 4, wherein said elongated aperture extends axially on both sides of each respective indent.

6. The electrical receptacle contact of claim 1, wherein said sleeve comprises at least one dimple which is deformed inwardly toward said receptacle contact.

7. The electrical receptacle contact of claim 6, wherein said dimple is deformed inwardly into an aperture of said receptacle contact.

8. An electrical receptacle contact assembly for electrically receiving a pin contact comprising a wire termination section, said receptacle contact further comprising:

first and second contact members each comprising a free end and respective first and second beam pairs with each beam including at least one section which comprises an inner edge, said inner edges are adapted to provide four points of contact with said pin;

said first and second contact members define a pin contact receiving area therebetween, said contact members are separated by two distinct gaps formed between said free ends, said gaps are located at opposed positions relative to an axial length of said contact, and said gaps expand as said pin contact is inserted into said receptacle contact;

and a sleeve member which encloses said contact members.

9. The electrical receptacle contact of claim 8, wherein said inner edges of said first beam pair are generally non-parallel.

10. The electrical receptacle contact of claim 8, wherein at least one of said inner edges of said first beam pair are generally parallel with at least one of said inner edges of said second beam pair.

11. The electrical receptacle contact of claim 8, wherein said first and second pairs of beams each comprise an elongated aperture between the respective beams thereof for imparting compliancy to the beam pairs.

12. The electrical receptacle contact of claim 11, wherein said first and second pairs of beams each comprise a web member which joins the respective beams thereof adjacent to said elongated aperture.

13. The electrical receptacle contact of claim 11, wherein said first and second pairs of beams comprises at least one respective indent formed on each respective beam thereof for providing four points of contact with said pin.

14. The electrical receptacle contact of claim 13, wherein said elongated apertures extend axially on both sides of each respective indent.

15. The electrical receptacle contact of claim 8, wherein said sleeve comprises at least one dimple which is deformed inwardly toward said receptacle contact.

16. The electrical receptacle contact of claim 15, wherein said dimple is deformed inwardly into an aperture of said receptacle contact.

17. The electrical receptacle contact of claim 8, wherein said sleeve comprises an annular edge.

18. The electrical receptacle contact of claim 8, wherein said sleeve comprises a cylindrical shape.

19. An electrical female contact assembly for electrically receiving a male contact, said female contact comprises a wire termination section, and said female contact further comprises:

a first twistable contact member comprising a free end and deflectable beams, each beam comprises at least one section having an inner surface, said inner surface is adapted for electrical engagement with said male contact;

a second twistable contact member comprising a free end and deflectable beams; and said first and second twistable contact members define a pin contact receiving area therebetween, said contact members are separated by two distinct gaps formed between said free ends, said gaps are located at opposed positions relative to an axial length of said contact, and said gaps expand as said pin contact is inserted into said receptacle contact.

20. The electrical female contact of claim 19, wherein said contact members comprise respective apertures between their respective beams which imparts compliancy to each contact member so that said contact members are operative to twist in response to engagement with said male contact.

21. The electrical female contact of claim 20, wherein said apertures comprise an elongated shape along the length of said contact members.

22. The electrical female contact of claim 20, wherein said apertures are of a non-uniform width along said contact members.

23. The electrical female contact of claim 20, wherein said apertures comprise a relatively enlarged width toward the end of said contact members adjacent to an insertion area for said male contact, said enlarged width imparts a localized compliancy to said contact members in the insertion area, thereby allowing said contact members to twist in response to engagement with said male contact.

24. The electrical female contact of claim 20, wherein said contact members each comprise a web member which joins the respective beams adjacent to said respective apertures, each said web is sized to allow said beams to twist independently of each other.

25. The electrical female contact of claim 24, wherein a cross-sectional area of each web, in alignment with said respective aperture, is less than the smallest cross sectional area, transverse to said respective aperture, of at least one of said respective beams, thereby allowing flexure across the cross section of each web as said male contact is inserted in said female contact and as said beams twist.

* * * * *